(12) United States Patent
De Azevedo et al.

(10) Patent No.: US 7,415,752 B2
(45) Date of Patent: Aug. 26, 2008

(54) RESILIENT FASTENER FOR FIXING TWO PARTS ONTO EACH OTHER

(75) Inventors: Helder De Azevedo, Sainville (FR); Dominique Dubost, La Celle Saint Cloud (FR)

(73) Assignee: ATTAX, Paris (FR)

( * ) Notice: Subject to any disclaimer, the term of this patent is extended or adjusted under 35 U.S.C. 154(b) by 0 days.

(21) Appl. No.: 11/511,280

(22) Filed: Aug. 29, 2006

(65) Prior Publication Data

US 2007/0044279 A1  Mar. 1, 2007

(30) Foreign Application Priority Data

Aug. 29, 2005 (FR) .................................. 05 08828

(51) Int. Cl.
- *F16B 5/12* (2006.01)
- *A44B 21/00* (2006.01)
- *F16B 5/06* (2006.01)

(52) U.S. Cl. ........................................................ 24/295
(58) Field of Classification Search .................. 24/289, 24/293, 294, 295, 588.11; 52/714, 770, 773, 52/774, 489.1, 489.2, 718.1, 718.04, 718.2, 52/718.06

See application file for complete search history.

(56) References Cited

U.S. PATENT DOCUMENTS

| | | | | |
|---|---|---|---|---|
| 1,793,127 A | * | 2/1931 | Osius | .......................... 52/772 |
| 2,109,213 A | | 2/1938 | Fearing | |
| 2,598,776 A | * | 6/1952 | Flora | ............................ 24/295 |
| 3,193,062 A | * | 7/1965 | Pendleton | ................... 403/283 |
| 3,977,048 A | * | 8/1976 | Benedetti | ...................... 24/293 |
| 4,883,397 A | | 11/1989 | Dubost | |
| 5,367,751 A | * | 11/1994 | DeWitt | ........................ 24/295 |
| 6,671,934 B2 | * | 1/2004 | Wenzlick et al. | .............. 24/295 |
| 6,918,162 B2 | * | 7/2005 | Bodo | .......................... 24/293 |

FOREIGN PATENT DOCUMENTS

DE    32 45 056 A1    6/1984

\* cited by examiner

*Primary Examiner*—Robert J Sandy
(74) *Attorney, Agent, or Firm*—Sughrue Mion, PLLC

(57) ABSTRACT

The resilient fastener for fixing two parts onto each other, having a general V-shape including an intermediate portion (2) in the shape of a pincer with two limbs (3, 4), and adapted to be engaged on a first part and from at least one of the limbs of which extends at least one lateral wing (6, 7) equipped with means, passing an over-center position, for fastening onto a corresponding edge of the second part in order to attach the fastener, and therefore the first part, to the second part, is characterized in that it has at the junction zone of the or each lateral wing (6, 7) and the corresponding limb (3, 4) of the intermediate portion, at least one cut-away portion in the shape of a barb (10, 11) extending in prolongation of the corresponding wing (6, 7) and in the direction of the intermediate portion, in order to lock the intermediate portion of the fastener on the first part

7 Claims, 2 Drawing Sheets

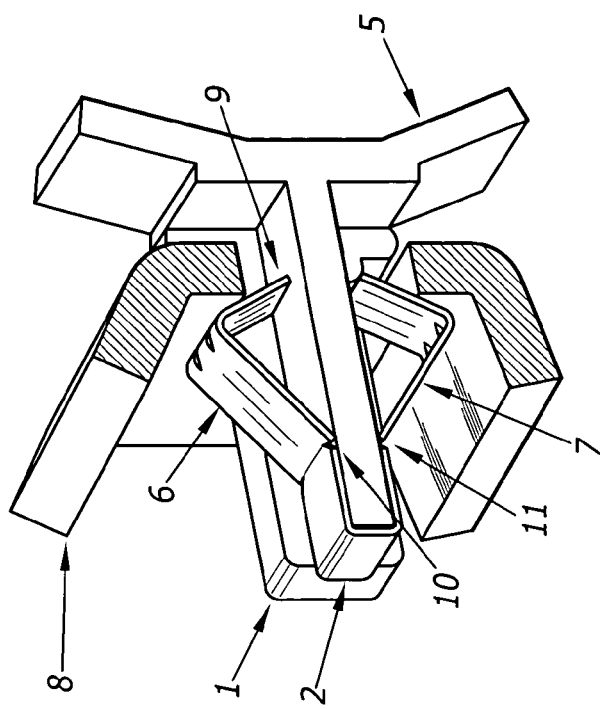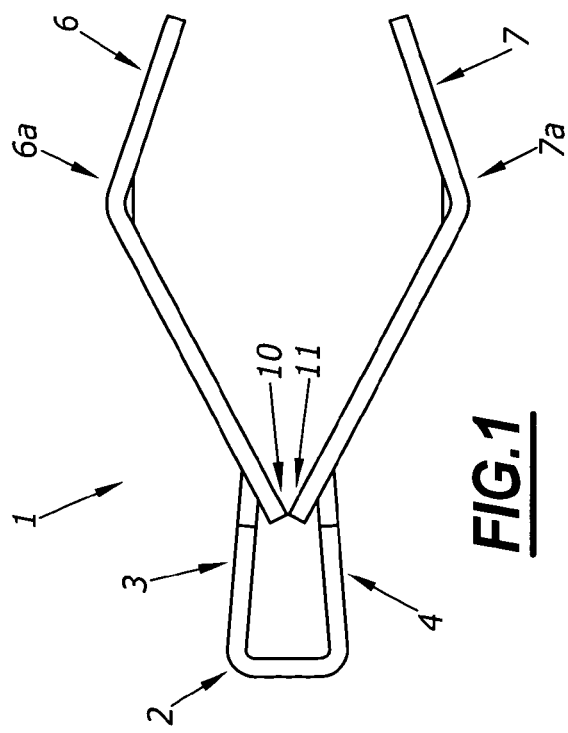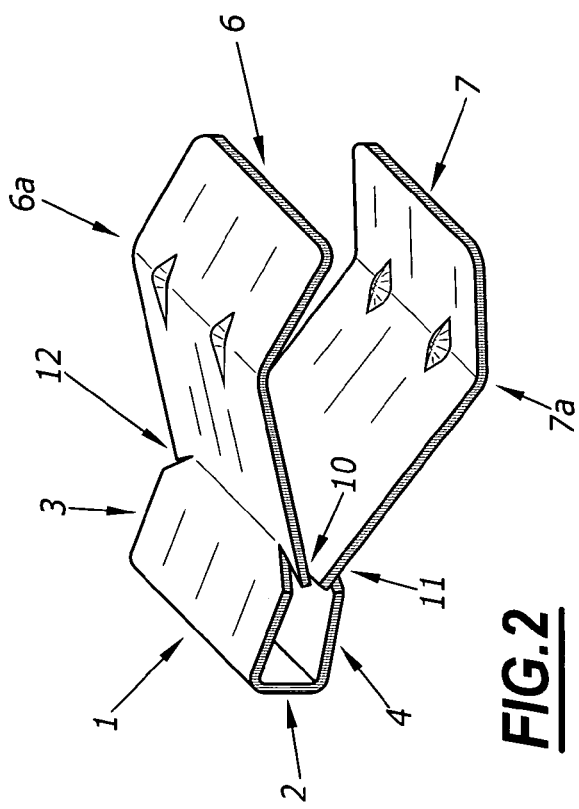

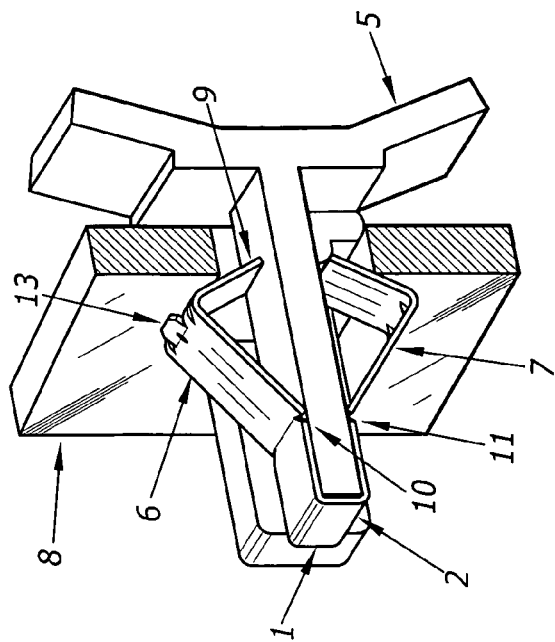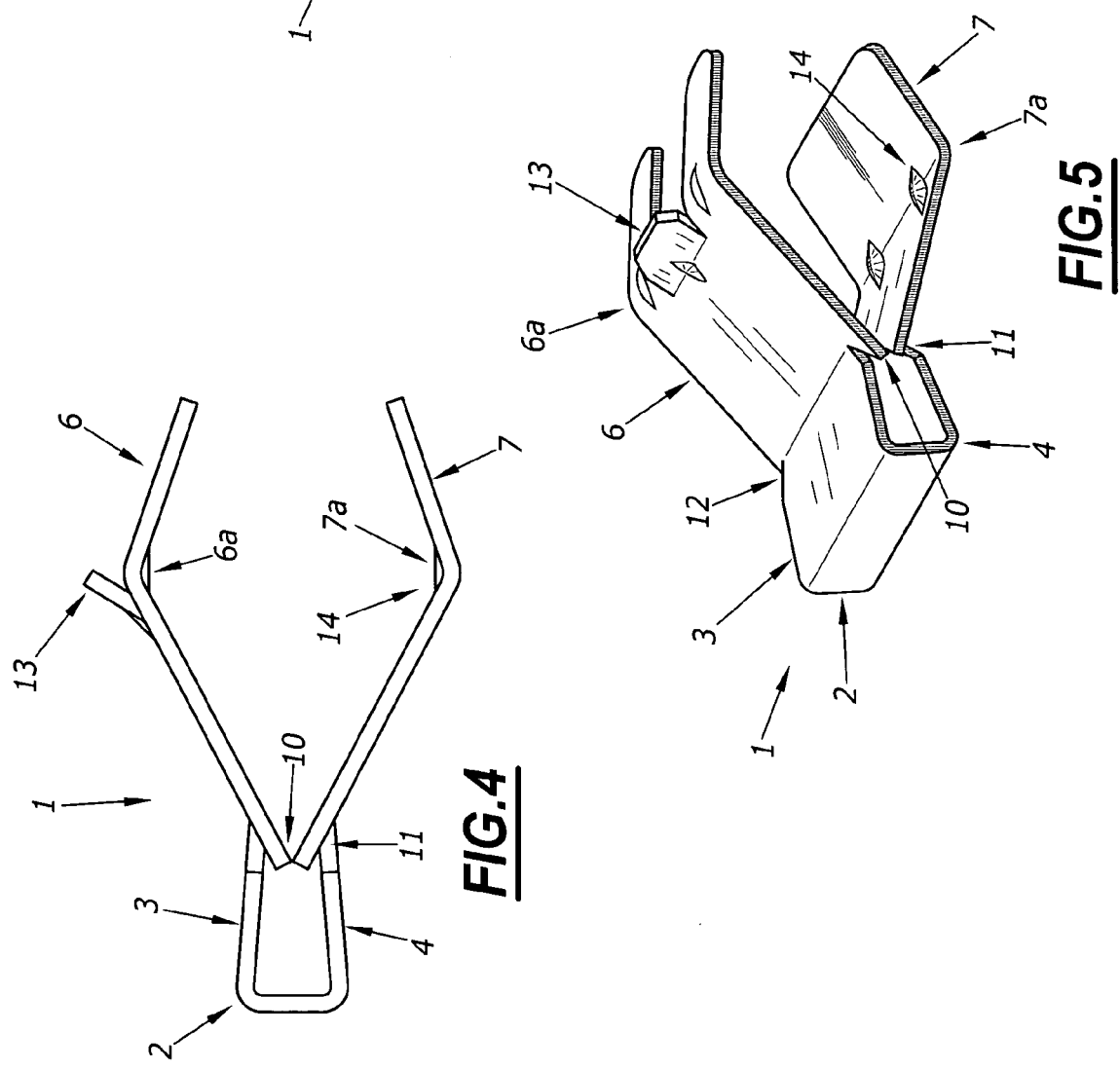

RESILIENT FASTENER FOR FIXING TWO PARTS ONTO EACH OTHER

BACKGROUND OF THE INVENTION

1. Field of the Invention

The present invention concerns a resilient fastener for fixing two parts onto each other.

More particularly, the invention relates to such a fastener which has a general V-shape including an intermediate portion in the shape of a pincer with two limbs, and adapted to be engaged on a first part and from at least one of the limbs of which extends at least one lateral wing equipped with means, passing an over-center position, for fastening onto a corresponding edge, for example, of an opening of a second part, in order to attach the fastener, and therefore the first part, to the second part.

Such resilient fasteners find numerous applications in particular in the automobile industry for fixing two pieces of equipment of a vehicle onto each other.

2. Description of the Prior Art

In the prior art there are resilient fasteners of this type in which the lateral wings of the fastener are equipped with means forming an outer leg having means in the form of resilient hooks, passing an over-center position, for attaching the fastener to the edges of an opening, for example, of one part, and with means forming an inner leg equipped with means for attaching the other part in order to fix the parts onto each other.

In the prior art, the means forming an inner leg of the fastener extend from the intermediate portion thereof, over a part of the height of the means forming an outer leg, and define a passage for receiving the other part.

However, fasteners of this type have a certain number of drawbacks, especially with regard to the difficulty of introducing the other part into the passage defined by the means forming an inner leg of the fastener and with regard to the reliability of the fixing and in particular to its resistance to tearing off.

Moreover, such fasteners may also be sources of vibration and therefore of noise.

The Applicant has already proposed different solutions for solving these problems.

The aim of the invention is to propose variants of resilient fasteners of this type.

SUMMARY OF THE INVENTION

To this end, the subject of the invention is a resilient fastener for fixing two parts onto each other, having a general V-shape including an intermediate portion in the shape of a pincer with two limbs, and adapted to be engaged on a first part and from at least one of the limbs of which extends at least one lateral wing equipped with means, passing an over-center position, for fastening onto a corresponding edge of the second part in order to attach the fastener, and therefore the first part, to the second part, wherein it has at the junction zone of the or each lateral wing and the corresponding limb of the intermediate portion, at least one cutaway portion in the shape of a barb extending in prolongation of the corresponding wing and in the direction of the intermediate portion, in order to lock the intermediate portion of the fastener on the first part.

According to other characteristics of the invention:

the barbs are produced by inclined cut-away portions starting from the edges of the intermediate portion of the fastener, the means, passing an over-center position, of the or each lateral wing include stiffening zones, the or each lateral wing of the fastener has at least one anti-recoil stop intended to bear against a complementary abutment surface of the second part in order to improve the resistance of the fastener to tearing-off, The anti-recoil stop is produced by cutting out and deformation of a tongue from the lateral wing of the fastener, it has symmetrical lateral wings starting from the limbs of the intermediate portion of the fastener, it is produced by cutting out and deformation of a sheet-metal blank.

The invention will be more clearly understood from the following description, provided solely by way of example and with reference to the appended drawings, in which:

BRIEF DESCRIPTION OF THE DRAWINGS

FIGS. 1, 2 and 3 respectively show views from the side, in perspective and in the assembly position of a first embodiment of a fastener according to the invention, and FIGS. 4, 5 and 6 show views similar to FIGS. 1, 2 and 3 for a second embodiment of a fastener according to the invention.

DESCRIPTION OF THE PREFERRED EMBODIMENTS

A first exemplary embodiment of a resilient fastener according to the invention is illustrated in FIGS. 1 to 3.

The resilient fastener is intended, for example, to fix two pieces of equipment of an automobile onto each other. The fastener is designated by the general reference 1 in the drawings and has the general shape of a V including an intermediate portion in the shape of a pincer with two limbs. The intermediate portion is designated by the general reference 2 and includes two limbs 3 and 4.

The intermediate portion 2 is adapted, as illustrated in FIG. 3, to be engaged on a first part designated by the general reference 5, and more particularly on a projecting portion thereof.

Moreover, at least one lateral wing equipped with means passing an over-center position extends from at least one of the limbs 3, 4 of the intermediate portion 2 of the fastener in the shape of a pincer with two limbs.

In the exemplary embodiment described, a lateral wing, respectively 6, 7, extends from each of the limbs 3 and 4 of the intermediate portion 2 of the fastener.

Other embodiments may of course be envisaged.

Each lateral wing therefore includes an elbow portion 6a, 7a which makes it possible to define means, passing an over-center position, for fastening onto the second part as illustrated in FIG. 3, the second part being designated by the general reference 8 in this figure.

In the position illustrated in FIG. 3, it can be imagined that, once the first part 5 and the fastener 1 are engaged for example in an opening 9 of the second part 8, the means, passing an over-center position, of the lateral wings 6 and 7 of the fastener make it possible to avoid any withdrawal of the latter in order to render the fixing of the parts onto each other reliable.

In fact, as illustrated in these drawings, the fastener includes at the junction zone of the or each lateral wing 6, 7, and the corresponding limb 3, 4 of the intermediate portion 2 of the fastener, inclined cut-away portions for defining, in prolongation of the or each lateral wing of the fastener and in the direction of the intermediate portion 2 thereof, locking barbs for locking the intermediate portion of the fastener on the first part in order to keep it reliably held in position on the latter.

The barbs are designated for example by the general references 10, 11 and 12 in the drawings. In the example illustrated, where the fastener has a lateral wing extending from each limb of the intermediate portion thereof, four barbs are thus provided. Other embodiments may of course be envisaged, the barbs being provided, for example, not on the edges of the intermediate portion but directly cut out from the latter.

It can therefore be imagined that, in this case, the barbs which extend in prolongation of the wing make it possible to improve the locking of the fastener in position on the first part and therefore the fixing of the first part on the second part.

An alternative embodiment of the fastener is illustrated in FIGS. 4, 5 and 6.

In these figures, identical reference numbers designate parts which are identical or similar to those illustrated in FIGS. 1 to 3.

Thus, in FIGS. 4, 5 and 6, the fastener 1, the intermediate portion 2 of the latter, the limbs 3 and 4, the lateral wings 6 and 7, the barbs 10, 11 and 12, and also the first part 5, the second part 8 and its opening 9, will be recognized.

In this embodiment, the lateral wings 6 and 7 of the fastener also include, for example at their elbow portion 6a, 7a, anti-recoil stops, one of which is designated by the general reference 13, and which are intended to bear against a complementary abutment surface of the second part 8 in order, as illustrated in FIG. 6, in the case of an attempt to tear off the first part, to improve the resistance to tearing off.

In fact, and as illustrated, the anti-recoil stops may be in the form of tongues cut out and deformed from the lateral wings 6, 7 of the fastener.

Finally, it will be noted that the lateral wings may also include, for example at the means passing an over-center position, that is to say, at the elbow portion of the lateral wings, stiffening zones, for example 14, obtained for example by swaging or other deformation thereof.

Still other embodiments may of course be envisaged.

Thus, for example, a fastener is illustrated which includes symmetrical lateral wings starting from the limbs of the intermediate portion thereof, but other embodiments, for example having a single lateral wing starting from a single limb of the intermediate portion of the fastener, may also be envisaged.

Similarly, different numbers of barbs, anti-recoil stops and stiffening zones, etc. may be envisaged.

Such a fastener may therefore be produced for example by cutting out and deformation of a sheet-metal blank.

We claim:

1. A resilient fastener for fixing a first part and a second part onto each other, having the general shape of a V comprising:
    an intermediate portion in the shape of a pincer having two limbs and adapted to engage a first part;
    a pair of lateral wing members each extending from a corresponding one of the two limbs at an angle such that the pair of lateral wing members diverge from one another as they extend from the limbs to bent portions in each of the lateral wing members, the pair of lateral wing members converging toward one another between the bend portions and end portions thereof distant from the two limbs;
    at least one cut-away portion in the shape of a barb extending in prolongation of each corresponding wing member and in the direction of the intermediate portion to lock the intermediate portion of the fastener on the first part,
    wherein portions of the pair of lateral wing members between the bend portions and the end portions are configured to press against the second part to thereby fasten the first part and the second part together.

2. A resilient fastener according to claim 1, wherein the barbs are formed by inclined cut-away portions starting from edges of the intermediate portion.

3. A resilient fastener according to claim 1, the bend portion of the or of each lateral wing member include stiffening zones.

4. A resilient fastener according to claim 1, wherein each lateral wing member of the fastener includes at least one anti-recoil stop configured to bear against a complementary abutment surface of the second part.

5. A resilient fastener according to claim 4, wherein the anti-recoil stop is integrally formed as a cutout portion of one of the pair of the lateral wing members of the fastener.

6. A resilient fastener according to claim 1, wherein the lateral wing members are symmetrical starting from the limbs of the intermediate portion thereof.

7. A resilient fastener according to claim 1, wherein the fastener comprises a continuous piece of sheet-metal.

\* \* \* \* \*